US011912457B2

(12) United States Patent
Fevre et al.

(10) Patent No.: US 11,912,457 B2
(45) Date of Patent: Feb. 27, 2024

(54) ROBOTIC LABELING SYSTEM AND METHOD OF LABELING PACKAGES

(71) Applicants: TE Connectivity Services GmbH, Schaffhausen (CH); Tyco Electronics (Shanghai) Co., Ltd., Shanghai (CN)

(72) Inventors: Martin Fevre, Middletown, PA (US); Du Wen, Reading, PA (US); Sonny O. Osunkwo, Harrisburg, PA (US); Lei Zhou, Shanghai (CN); Jiankun Zhou, Mechanicsburg, PA (US); Roberto Francisco-Yi Lu, Bellevue, WA (US)

(73) Assignees: Tyco Electronics Shanghai Co. Ltd. (CN); TE Connectivity Solutions GmbH (CH)

( * ) Notice: Subject to any disclaimer, the term of this patent is extended or adjusted under 35 U.S.C. 154(b) by 67 days.

(21) Appl. No.: 17/585,644

(22) Filed: Jan. 27, 2022

(65) Prior Publication Data

US 2022/0371763 A1 Nov. 24, 2022

(51) Int. Cl.

| | |
|---|---|
| ***B32B 41/00*** | (2006.01) |
| ***B65C 9/40*** | (2006.01) |
| ***B65C 3/08*** | (2006.01) |
| ***B65C 9/02*** | (2006.01) |

(52) U.S. Cl.
CPC .................. *B65C 9/40* (2013.01); *B65C 3/08* (2013.01); *B65C 9/02* (2013.01); *B65C 2009/408* (2013.01)

(58) Field of Classification Search
CPC .... B65C 9/40; B65C 3/08; B65C 9/02; B65C 2009/408; B65C 9/46; B65C 1/021; B65C 9/26
USPC .................... 156/60, 64, 350, 351, 378, 379
See application file for complete search history.

(56) References Cited

U.S. PATENT DOCUMENTS

2022/0097892 A1* 3/2022 Wen .......................... B65C 9/44

* cited by examiner

*Primary Examiner* — Michael N Orlando
*Assistant Examiner* — Joshel Rivera

(57) ABSTRACT

A robotic labeling system includes a package locating system and a package identification station identifying a package orientation. The robotic labeling system includes a label application station having first and second label printers and first and second label applicators. The label printers are both capable of printing a shipping label and a customer specific label. The first label applicator applies a first label (either the shipping label or the customer specific label) to a first side of the package while the second label applicator applies a second label (other of the shipping label or the customer specific label) to a second side of the package different than the first side. The printing and application of the labels is based on the orientation of the package.

20 Claims, 6 Drawing Sheets

ROBOTIC LABELING SYSTEM AND METHOD OF LABELING PACKAGES

CROSS REFERENCE TO RELATED APPLICATIONS

This application claims benefit to Chinese Application No. 202110559429.4, filed 21 May 2021, the subject matter of which is herein incorporated by reference in its entirety.

BACKGROUND OF THE INVENTION

The subject matter herein relates generally to package labeling systems and methods.

Package labeling is a manual process at many warehouses and distribution centers. The manual labeling process relies on operators to determine the location where the labels need to be applied. Manual labeling processes have high labor costs, are subject to human error, and are time consuming to apply the labels. Additionally, labels applied manually to packages may be at improper or unwanted positions and may be applied inconsistently from package to package. Some known automated labeling systems are in use in warehouses and distribution centers. However, conventional labeling systems use simple labeling methods to apply the labels to the packages. For example, the conventional labeling systems use a single axis arm attached to a printer to apply the label to the box. The label is always applied to the same side of the box. The box is required to have a particular orientation relative to the printer and the label applicator. Additionally, known automated labeling systems do not accommodate different sized packages. Some known automated labeling systems include multiple scanners to scan all sides of the package for identification of the package. Such systems are expensive due to the high number of costly scanning devices. Additionally, set up of the system is labor intensive and time consuming.

A need remains for a dynamic, automated labeling system for labeling packages.

BRIEF DESCRIPTION OF THE INVENTION

In one embodiment, a robotic labeling system for labeling a package having an identification tag is provided. The robotic labeling system includes a package identification station having a frame, a first camera mounted to the frame, a second camera mounted to the frame remote from the first camera, and a scanning device mounted to the frame. The robotic labeling system includes the frame forming a scan tunnel configured to receive the package. The first camera imaging a first area of the scan tunnel to image the package from a first angle. The second camera imaging a second area of the scan tunnel different from the first area to image the package from a second angle. The scanning device has a tag reader movable in three-dimensional space within the scan tunnel to scan the identification tag of the package based on the images from the first and second cameras.

In another embodiment, a robotic labeling system for labeling a package having an identification tag is provided. The robotic labeling system includes a package locating system having at least one conveyor for moving the package to a package identification station and a label application station of the robotic labeling system. The package identification station includes a frame forming a scan tunnel configured to receive the package from the at least one conveyor. The package identification station includes a first camera mounted to the frame and a second camera mounted to the frame remote from the first camera. The first camera imaging a first area of the scan tunnel to image the package from a first angle. The second camera imaging a second area of the scan tunnel different from the first area to image the package from a second angle. The package identification station includes a scanning device mounted to the frame having a tag reader movable in three-dimensional space within the scan tunnel to scan the identification tag of the package based on the images from the first and second cameras. The label application station includes a label printer and a label applicator. The label printer is configured to print a package label. The label applicator operates with the label printer to apply the package label to the package. The printing of the package label by the label printer is based on the scan of the identification tag by the tag reader. The application of the package label by the label applicator is based on the scan of the identification tag by the tag reader.

In a further embodiment, a method of labeling a package is provided. The method locates the package in a scan tunnel at a package identification station. The method positions a first camera in the scan tunnel to image a first area of the scan tunnel and positions a second camera in the scan tunnel to image a second area of the scan tunnel different than the first area. The method imaging the package in the scan tunnel with the first camera from a first angle and imaging the package in the scan tunnel with the second camera from a second angle different than the first angle. The method processes a first image of the package from the first camera and a second image of the package from the second camera to determine a side of the package has an identification tag and scans the identification tag of the package identified by processing the first and second images. The scanning is performed by a tag reader of a scanning device movable in three-dimensional space within the scan tunnel to all sides of the package.

DETAILED DESCRIPTION OF THE INVENTION

Figure 1:
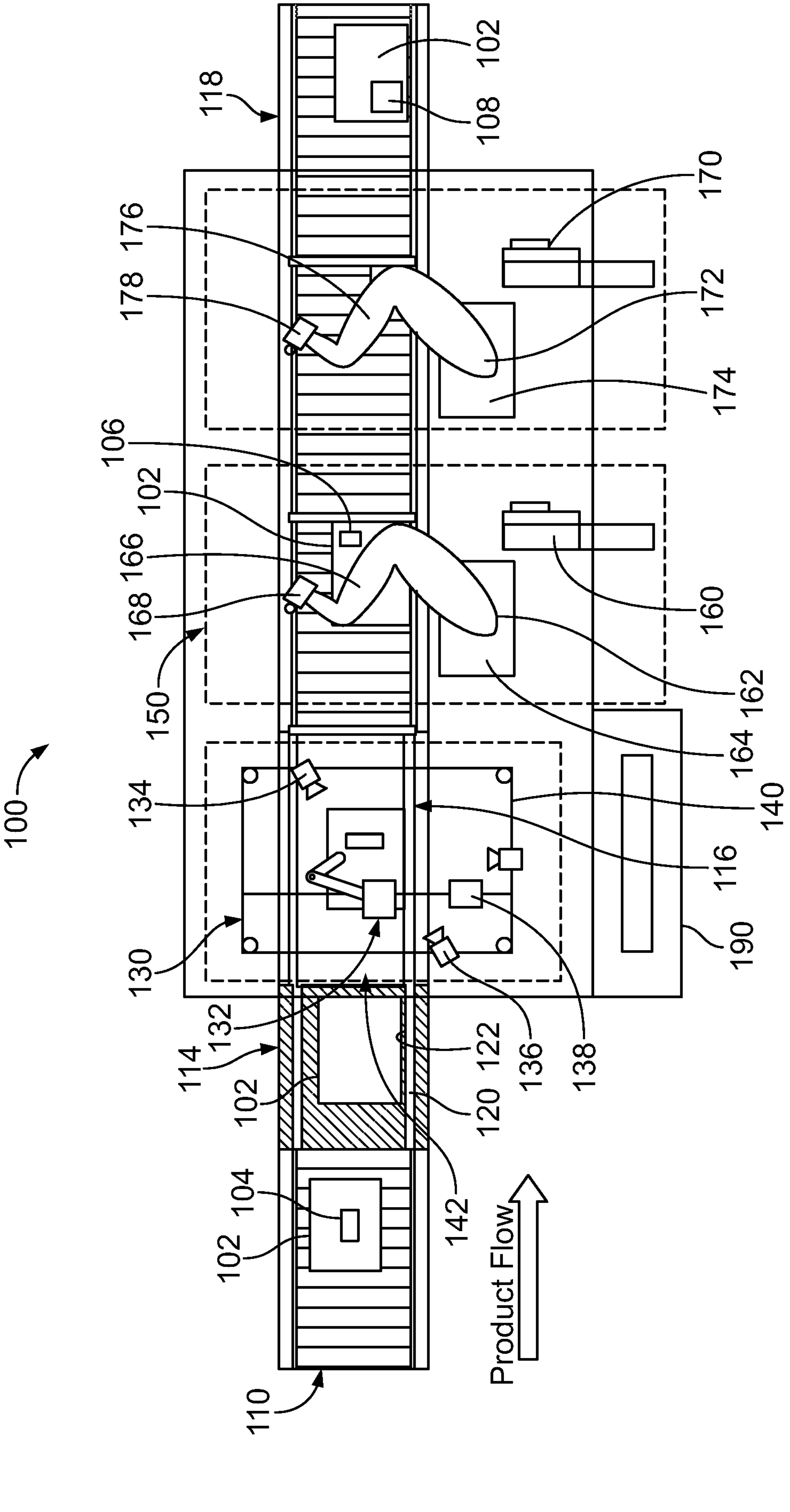
FIG. 1 illustrates a robotic labeling system in accordance with an exemplary embodiment.

FIG. 1 illustrates a robotic labeling system 100 in accordance with an exemplary embodiment. The robotic labeling system 100 is an automated system used for labeling packages 102. The robotic labeling system 100 is an automated system used to determine characteristics of the packages 102 for proper labeling. For example, the robotic labeling system 100 may identify the particular package 102, such as using a unique identifier, may determine an orientation of the package 102, may detect dimensions of the package 102, may generate particular labels for the package 102, may determine appropriate locations for applying the labels to the package 102, and may automatically apply the labels to the package. The robotic labeling system 100 may include one or more stations for performing the various tasks. The robotic labeling system 100 uses intelligent control algorithms to assign tasks to the components of the robotic labeling system 100 for time efficient, dynamic labeling solutions.

The robotic labeling system 100 includes a package locating system 110 for locating the package 102 within the various stations. The robotic labeling system 100 includes a package identification station 130 for identifying the package 102. The robotic labeling system 100 includes a label application station 150 for applying labels to the package 102. In an exemplary embodiment, the label application station 150 applies multiple labels to each package 102. In an exemplary embodiment, the label application station 150 applies different types of labels to each package 102. The labels may be applied to various sides of the package 102. The robotic labeling system 100 may include multiple label application stations 150 arranged in series for labeling different packages 102 or for applying different labels to each of the packages 102. The robotic labeling system 100 may include additional stations in alternative embodiments. In other various embodiments, the package identification station 130 and the label application station 150 may be provided within a single station (for example, various tasks performed at the same stop/location).

The package 102 may be a box, such as a cardboard box, or other type of container. In various embodiments, the package 102 may be parallelepiped having six sides, including a top side, a bottom side, a front side, a rear side, a right side, and a left side. The package 102 may include additional sides in alternative embodiments. The package 102 may have other shapes in alternative embodiments.

In an exemplary embodiment, the package 102 includes an identification tag 104, also referred to as a license tag, at one of the sides. For example, the identification tag 104 may be a label applied to one of the sides. Alternatively, the identification tag 104 may be printed directly on one of the sides. The identification tag 104 is used to identify the particular package 102 (for example, compared to other packages 102). The identification tag 104 may be a unique identifier for the package 102. Information about the package 102 may be associated with the identification tag 104, such as data contained in a warehouse management system, and stored as identifying data. The identifying data about the package 102 may include content information relating to the contents of the package. The identifying data about the package 102 may include dimensional information relating to the height, width and length of the package. The identifying data may include shipping information relating to the package 102. In various embodiments, the identification tag 104 is a scannable tag, such as a barcode, a data matrix, a QR code, or another type of symbolic scan code. The identification tag 104 may be used to track the package 102 within a warehouse software system. In various embodiments, the identification tag 104 is applied to the package 102 outside of the label application station 150. For example, the identification tag 104 may be applied to the package 102 prior to the package 102 being transported to the label application station 150. The identification tag 104 may be applied to the package 102 when the package 102 is formed or when the package 102 is filled, such as at a packing station upstream of the label application station 150. The package 102 may be received in the robotic labeling system 100 with the identification tag 104 at any of the sides of the package 102. For example, the package 102 does not need to be loaded in a particular orientation, but rather may be loaded into the system in any orientation and the robotic labeling system 100 is capable of determining the orientation for later processing, such as for applying labels to other sides of the package 102. In various embodiments, multiple identification tags 104 may be provided, such as on two opposite sides (for example, to avoid having the identification tag 104 on the bottom side, and thus unviewable, as the package 102 is presented to the robotic labeling system 100).

In an exemplary embodiment, the robotic labeling system 100 is used to apply a shipping label 106 to the package 102. The shipping label 106 contains information about where the package 102 is being shipped. The shipping label 106 may include a name, an address, or other identifying data. In various embodiments, the shipping label 106 may include symbolic scan codes used for shipping. The shipping label 106 is applied to the package 102 at the label application station 150. The shipping label 106 may be applied to any of the sides other than the side that includes the identification tag 104. In various embodiments, the label application station 150 does not apply any other labels to the side that receives the shipping label 106.

In an exemplary embodiment, the package 102 receives one or more customer specified labels 108. The customer specified label 108 may contain information about the contents of the package 102 or other information. For example, the customer specified label 108 may contain information about the shipper of the package 102, the location of where the package 102 is being shipped from, return shipping information, warning labels regarding the package 102 or the content of the package 102, and the like. In various embodiments, the customer specified labels 108 may include symbolic scan codes having data relating to the content of the package 102 or other information. The customer specified labels 108 are applied to the package 102 at the label application station 150. The customer specified labels 108 may be applied to any of the sides of the package other than the side that includes the identification tag 104. Other types of labels may be applied to the package 102 in alternative embodiments.

In an exemplary embodiment, the package locating system 110 includes a transportation device 112 for moving the package 102 through the robotic labeling system 100. In the illustrated embodiment, the transportation device 112 includes an alignment conveyor 114, a package identification station conveyor 116, and a label application station conveyor 118 that generally move the package 102 through the robotic labeling system 100 in a conveyor direction. Other types of transportation devices 112 may be used in alternative embodiments, such as automated guided vehicles, vibration tables, pick and place robots, and the like. The package identification station conveyor 116 moves the package 102 through the package identification station 130. The label application station conveyor 118 moves the package 102 through the label application station 150.

The package locating system 110 includes a package positioner 120 having one or more locating surfaces 122 for locating the package 102. For example, the package positioner 120 may include a wall or rail used to position the package 102. The package positioner 120 is used with the alignment conveyor 114 to position the package 102. For example, the alignment conveyor 114 may move the package in a transverse direction (for example, angled relative to the conveyor direction of the conveyors 116, 118) to direct the package 102 into the package positioner 120. The locating surface 122 is used to straighten the package (for example, orient one of the sides of the package parallel to the conveyor direction). The package positioner 120 may include a stop gate or other device used to stop the package 102 on the conveyor 116 prior to moving into the package identification station 130, such as to wait until the previous package 102 is moved on from the package identification station 130.

In an exemplary embodiment, the package identification station 130 includes a frame 140 forming a scan tunnel 142 that receives the package 102. The package identification station 130 includes a scanning device 132 and cameras 134, 136 mounted to the frame 140. The package identification station 130 may include a package measuring device 138 for measuring one or more dimensions of the package 102.

The scanning device 132 is used to identify the package 102. For example, the scanning device 132 scans the identification tag 104 to identify the package 102. The scanning device 132 is located upstream of the label application station 150 to identify the package 102 prior to sending the package 102 to the label application station 150. In an exemplary embodiment, the first camera 134 and the second camera 136 image the package 102. The first and second images from the first and second cameras 134, 136 are used to control operation of the scanning device 132. For example, the scanning device 132 may be moved relative to the package 102 to scan the side of the package 102 having the identification tag 104 based on processing of the images to determine which side includes the identification tag 104. The cameras 134, 136 image the package 102 and create digital images of the package 102. The digital images may be concatenated to analyze a single or combined image rather than analyzing separate digital images. Greater or fewer cameras may be provided in alternative embodiments.

The label application station 150 is used to apply the label(s) to one or more of the sides of the package 102. In an exemplary embodiment, the label application station 150 includes a first label printer 160 and a second label printer 170 configured to print corresponding labels for the package 102. The label application station 150 includes a first label applicator 162 and a second label applicator 172 configured to transfer the labels from the first and second label printers 160, 170, respectively, to the package(s) 102. The first and second label applicators 162, 172 are used to apply the corresponding labels to the package(s) 102. For example, the first and second label applicators 162, 172 may press the labels onto the sides of the package 102.

The first label applicator 162 works in association with the first label printer 160 and retrieves labels from the first label printer 160 to avoid interference or crashing of the label applicators 162, 172 during operation. In an exemplary embodiment, the first label applicator 162 includes a first multi-axis robot 164 having an articulating arm 166 that moves between the first label printer 160 and the package 102. A first end effector 168 is provided at the end of the arm 166 to pick up the label from the first label printer 160 and to apply the label to the side of the package 102.

The second label applicator 172 works in association with the second label printer 170 and retrieves labels from the second label printer 170 to avoid interference or crashing of the label applicators 162, 172 during operation. In an exemplary embodiment, the second label applicator 172 includes a second multi-axis robot 174 having an articulating arm 176 that moves between the second label printer 170 and the package 102. A second end effector 178 is provided at the end of the arm 176 to pick up the label from the second label printer 170 and to apply the label to the side of the package 102. In various embodiments, the end effectors 168, 178 may be vacuum end effectors configured to hold the labels. Other types of end effectors may be used in alternative embodiments. Other types of label applicators, other than multi-axis robot, may be used in alternative embodiments.

The operation of the first and second label printers 160, 170 may be controlled based on the orientation of the package 102. For example, the operation of the first and second label printers 160, 170 may be controlled based on the location or side of the package 102 having the identification tag 104. In a first labeling scheme, the first label printer 160 prints the shipping label 106 and the second label printer 170 prints the customer specified labels 108. In a second labeling scheme, the first label printer 160 prints the customer specified labels 108 and the second label printer 170 prints the shipping label 106. In alternative embodiments, both label printers 160 are capable of printing both labels 106, 108. The operation of the first and second label applicators 162, 172 may be controlled based on the orientation of the package 102. For example, the label applicator may be moved to a particular side of the package 102 based on the orientation of the package 102.

In an exemplary embodiment, the robotic labeling system 100 includes a controller 190 that controls operation of the components of the robotic labeling system 100. The controller 190 is operably coupled to the first and second label printers 160, 170 and the first and second label applicators 162, 172 to control the printing and application of the labels 106, 108. The controller 190 receives inputs from the cameras 134, 136, such as to process the images to determine the location of the identification tag 104 on the package 102. The controller 190 may determine the orientation of the package 102 within the system by determining the side of the package 102 having the identification tag 104. The controller 190 receives inputs from the scanning device 132, such as when the scanning device 132 scans the identification tag 104. The controller 190 may include a database having data relating to each of the packages, such as the contents, dimensions, shipping information, and the like. The controller 190 may have a look up table configured to look up data relating to the package 102 based on the scanning of the identification tag 104. The controller 190 determines which of the label printers 160, 170 is used to print the shipping label 106 and which of the label printers 160, 170 is used to print the customer specified labels 108. The controller 190 determines which of the label applicators 162 is used to apply the shipping label 106 and which of the label applicators 162, 172 is used to apply the customer specified labels 108. The controller 190 controls operation of the label printers 160, 170 and the label applicators 162, 172 based on the orientation of the package 102. For example, the controller 190 controls operation of the label printers 160, 170 and the label applicators 162, 172 based on the side having the identification tag 104. The controller 190 controls operation of the label applicators 162, 172 based on the size and shape of the package 102. For example, the controller 190 determines appropriate labeling locations based on the size and shape of the package 102, and controls movements of the label applicators 162, 172 to move to such labeling locations.

Figure 2:
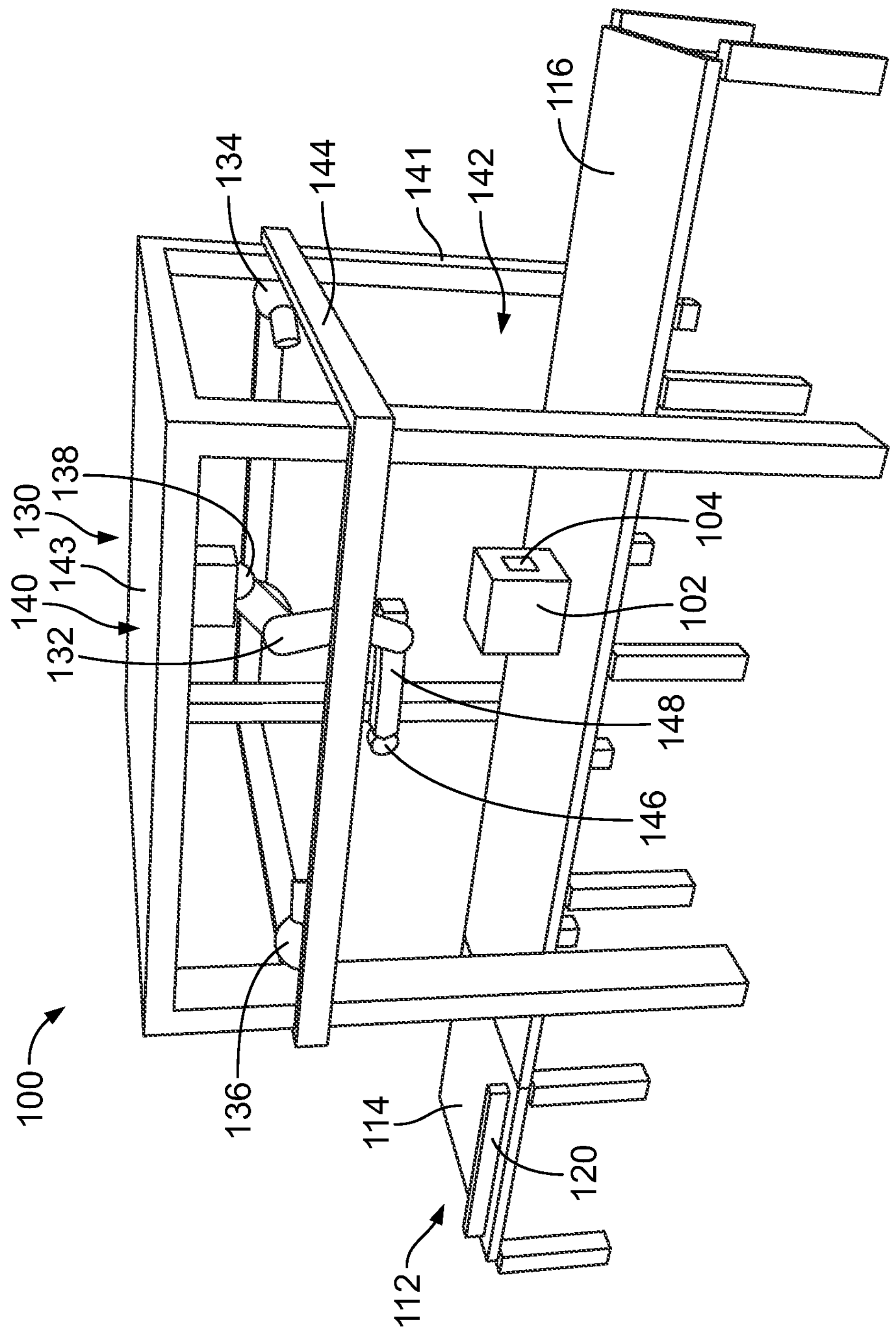
FIG. 2 illustrates a package identification station of the robotic labeling system in accordance with an exemplary embodiment.

FIG. 2 illustrates the package identification station 130 in accordance with an exemplary embodiment. FIG. 2 shows the transportation device 112 for moving the package 102 through the scan tunnel 142. For example, the alignment conveyor 114 aligns the package 102 with the package identification station conveyor 116, such as using the package positioner 120 to orient one of the sides of the package 102 parallel to the conveyor direction through the scan tunnel 142.

In an exemplary embodiment, the frame 140 of the package identification station 130 includes support legs 141 and a top wall 143 above the scan tunnel 142. The scan tunnel 142 is open at the front and the rear of the frame 140 to allow the package 102 to enter and exit the scan tunnel 142. The sides of the frame 140 may be open. Alternatively, the frame 140 may include walls along the sides to close in the scan tunnel 142. The frame 140 may include other legs or walls in alternative embodiments. In the illustrated embodiment, the package identification station conveyor 116 passes through the scan tunnel 142, such as between the support legs 141. In an exemplary embodiment, the scanning device 132 is coupled to the top wall 143. For example, the scanning device 132 may be approximately centered in the scan tunnel 142 to move around the package 102, such as for scanning all sides of the package 102. However, the scanning device 132 may be coupled to other components, such as one of the legs 141, a side wall, the floor or the package identification station conveyor 116. In an exemplary embodiment, the package measuring device 138 is coupled to the top wall 143. For example, the package measuring device 138 may be approximately centered in the scan tunnel 142 to view and measure the package 102. However, the package measuring device 138 may be coupled to other components, such as one of the legs 141, a side wall, or the package identification station conveyor 116. In various embodiments, multiple package measuring devices 138 may be provided, such as for measuring different dimensions (for example, height, width, length, respectively).

In an exemplary embodiment, the package identification station 130 includes one or more positioning rails 144 coupled to the frame 140. For example, the positioning rail(s) 144 may be coupled to the legs 141. The positioning rail 144 is located above the package identification station conveyor 116. The positioning rail 144 is used to support the first and second cameras 134, 136. In an exemplary embodiment, the first camera 134 and/or the second camera 136 is movable along the positioning rail 144 to change viewing angle(s) of the first camera 134 and/or the second camera 136. In the illustrated embodiment, the positioning rail 144 is a loop extending circumferentially around the scan tunnel 142. The positioning rail 144 may be circular and continuous around the scan tunnel 142. The positioning rail 144 may have other shapes in alternative embodiments. In various embodiments, the positioning rail 144 may be non-continuous including rail segments for supporting the cameras 134, 136 separately. In such embodiment, the cameras 134, 136 are independently movable on the corresponding rail segments.

During use, when the package 102 is located in the scan tunnel 142, the package identification process is initiated to identify characteristics of the package 102 for further processing, such as for package labeling downstream at the label application station 150 (shown in FIG. 1). The cameras 134, 136 are used to image the package 102. In an exemplary embodiment, the two cameras 134, 136 are positionable within the scan tunnel 142 to image all viewable sides of the package 102 (for example, the top and the four sides, with the bottom being unviewable). For example, the first camera 134 may view the top and two of the sides and the second camera 136 may view the top and the other two sides. As such, all viewable sides of the package 102 may be imaged with two images (one image for each of the cameras 134, 136). The images are transmitted to the controller 190 for processing. The images are analyzed by the controller 190 to determine which side of the package 102 includes the identification tag 104 (referred to as the identification side of the package).

After the identification side of the package 102 is determined, the controller 190 triggers the scanning device 132 to scan the identification tag 104 at the identification side. In an exemplary embodiment, the scanning device 132 includes a tag reader 146 provided at an end of a reader manipulator 148. The reader manipulator 148 may include an articulating arm movable in three dimensional space. For example, the reader manipulator 148 may be a multi-axis robot. The reader manipulator 148 is configured to move the tag reader 146 to the identification side of the package 102 in proximity to the identification tag 104 to scan the identification tag 104. In various embodiments, the tag reader 146 is an optical scanner, such as a barcode reader. In other various embodiments, the tag reader 146 may be a proximity sensor and the identification tag 104 may be a proximity target. The controller 190 uses the scanned information to determine the particular package, such as using a look-up table to identify the particular package. The package information is used for further processing, such as for labeling.

After the identification side of the package 102 is determined, the controller 190 triggers the package measuring device 138 to measure the package 102. In an exemplary embodiment, the package measuring device 138 includes an optical scanner for scanning the package 102 to determine one or more dimensions of the package 102, such as the height and/or the width and/or the length of the package 102. In other various embodiments, the package measuring device 138 may include laser measuring devices to determine one or more dimensions. Other types of measuring devices may be used in alternative embodiments. The dimensions of the package 102 are used to control the label application station 150. For example, the label application station 150 may use the dimensions to determine relevant labeling locations on the package 102. In an exemplary embodiment, the robotic labeling system 100 is capable of receiving different sized and shaped packages 102 and is capable of labeling such packages 102 by automatically determining the size and shape of the particular package 102 using the package measuring device 138.

Figure 3:
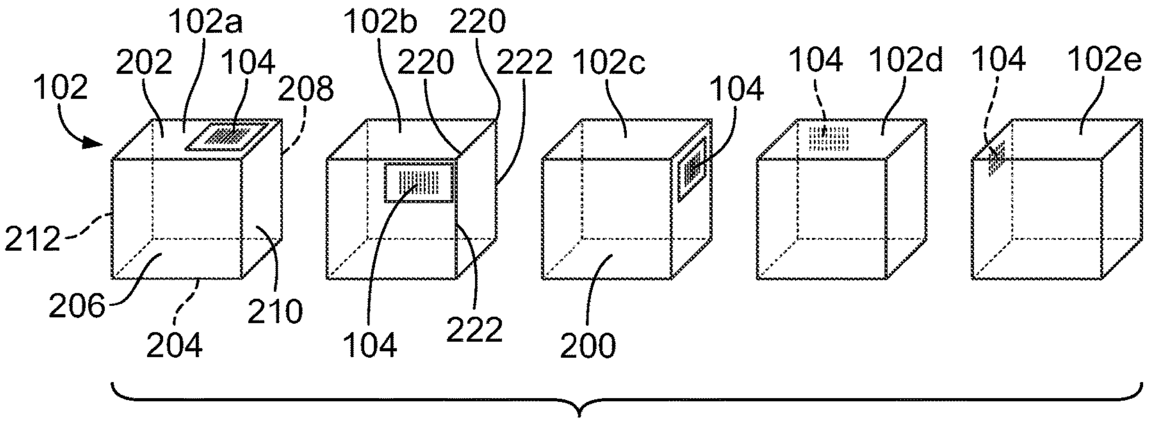
FIG. 3 illustrates packages having various orientations in accordance with an exemplary embodiment.

FIG. 3 illustrates packages 102 having various orientations. In an exemplary embodiment, the package 102 is a box, such as a cardboard box, or other type of container. In various embodiments, the package 102 may be parallelepiped having six sides 200, including a top side 202, a bottom side 204, a front side 206, a rear side 208, a right side 210, and a left side 212. The package 102 may include additional sides 200 in alternative embodiments. The package 102 may have other shapes in alternative embodiments. In various embodiments, the sides 200 may be flat or planar. Alternatively, one or more of the sides 200 may be curved. In an exemplary embodiment, the sides 200 meet at corners 220 and have edges 222 extending between the corners 220.

The orientation of the package 102 is based on the side 200 having the identification tag 104. The package identification station 130 (shown in FIG. 2) is used to identify the particular side 200 having the identification tag 104. FIG. 3 illustrates the package 102*a* having a top-side orientation with the identification tag 104 at the top side 202; illustrates the package 102*b* having a front-side orientation with the identification tag 104 at the front side 206, illustrates the package 102*c* having a right-side orientation with the identification tag 104 at the right side 210; illustrates the package 102*d* having a rear-side orientation with the identification tag 104 at the rear side 208; and illustrates the package 102*e* having a left-side orientation with the identification tag 104 at the left side 212. The operation of the label application system 150 (shown in FIG. 1) is controlled based on which side 200 has the identification tag 104. For example, the controller 190 may determine appropriate sides 200 to apply the shipping label 106 and the customer specified label 108 based upon which side 200 has the identification tag 104.

Figure 4:
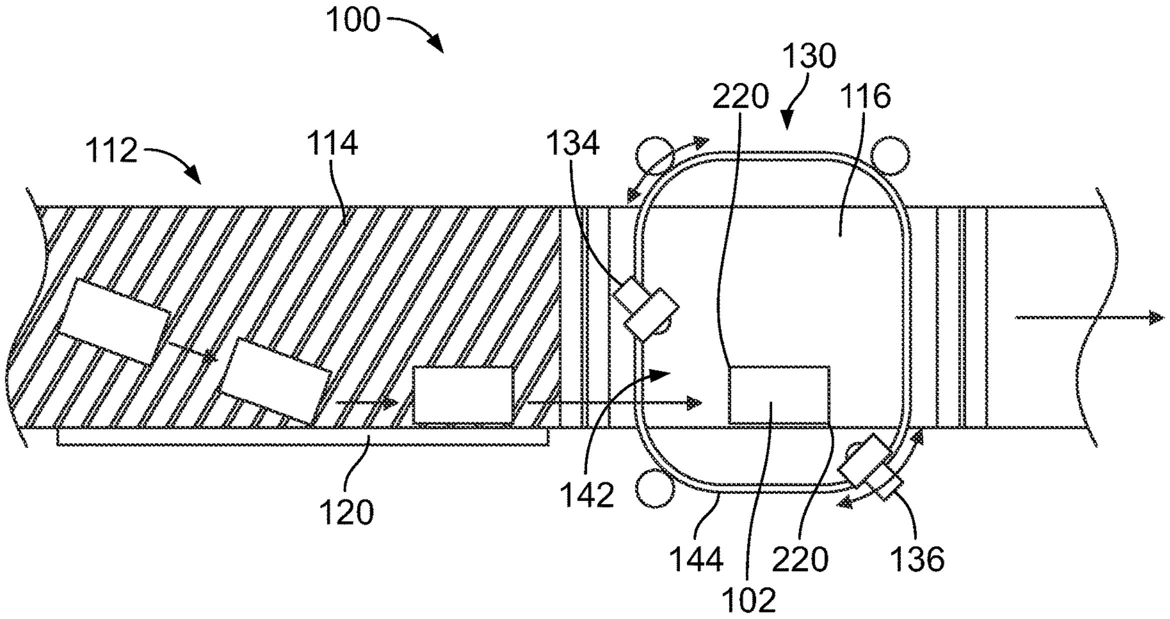
FIG. 4 is a top view of a portion of the robotic labeling system in accordance with an exemplary embodiment.

FIG. 4 is a top view of a portion of the robotic labeling system 100 in accordance with an exemplary embodiment. FIG. 4 shows the transportation device 112 for moving the package 102 through the scan tunnel 142. For example, the alignment conveyor 114 aligns the package 102 with the package identification station conveyor 116. The alignment conveyor 114 moves the package 102 toward the package positioner 120, such as transversely across the alignment conveyor 114. The package 102 is moved against the package positioner 120 to orient the side of the package 102 parallel to the conveyor direction through the scan tunnel 142.

The package identification station 130 includes the positioning rail 144 above the package identification station conveyor 116. The positioning rail 144 supports the first and second cameras 134, 136. The cameras 134, 136 are movable along the positioning rail 144 to change a viewing angle of the cameras 134, 136 relative to the package 102. In an exemplary embodiment, mounting brackets 135 couple the cameras 134, 136 to the positioning rail 144. The brackets 135 may be slidable along the positioning rail 144, such as being slidable within a track of the positioning rail 144. In an exemplary embodiment, the cameras 134, 136 are rotatable to change a viewing angle of the cameras 134, 136 relative to the package 102. The cameras 134, 136 are independently movable. In an exemplary embodiment, the cameras 134, 136 are movable to view opposite corners 220 of the package 102, such as to view both adjacent sides in a single image.

Figure 5:
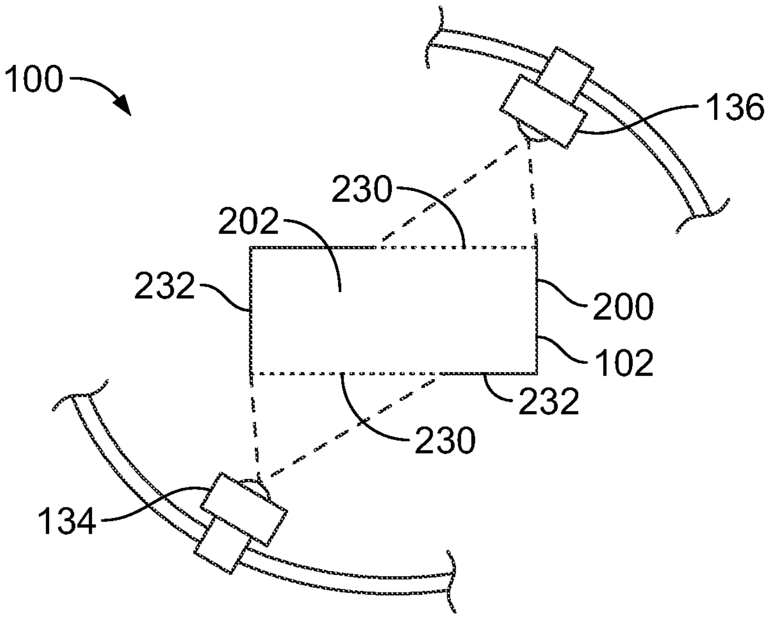
FIG. 5 is a top view of a portion of the robotic labeling system in accordance with an exemplary embodiment.
Figure 6:
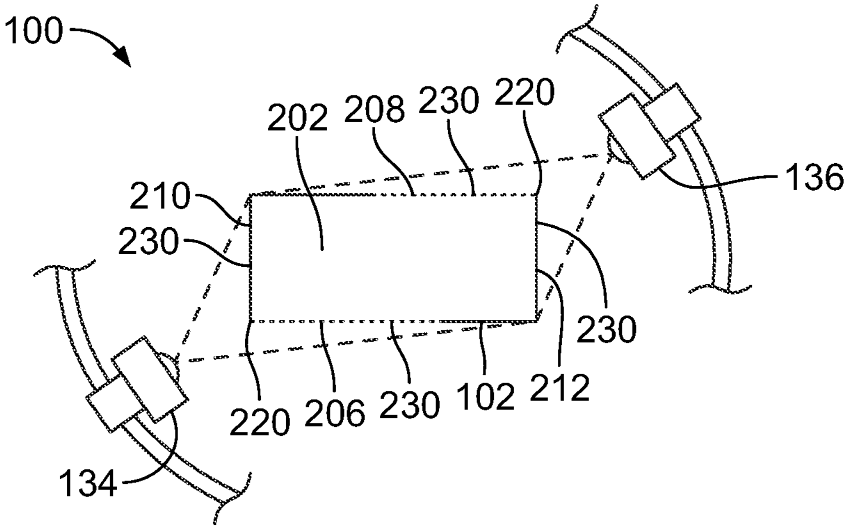
FIG. 6 is a top view of a portion of the robotic labeling system in accordance with an exemplary embodiment.

FIG. 5 is a top view of a portion of the robotic labeling system 100 in accordance with an exemplary embodiment. FIG. 6 is a top view of a portion of the robotic labeling system 100 in accordance with an exemplary embodiment. FIG. 5 illustrates the cameras 134, 136 misaligned relative to the package 102 wherein portions of the package 102 are occluded or out of view. FIG. 6 illustrates the cameras 134, 136 aligned with the package 102 viewing all sides 200 of the package 102.

During operation, the cameras 134, 136 are moved to positions on opposite sides of the package 102 to view different portions of the package 102. In an exemplary embodiment, the cameras 134, 136 are configured to be aligned with opposite corners 220 of the package 102. When aligned with the corners 220, the cameras 134, 136 are capable of viewing all sides 200 of the package 102. For example, the first camera 134 views the front side 206 and the right side 210 and the second camera 136 views the rear side 208 and the left side 212. Optionally, the cameras 134, 136 may be elevated slightly above the package 102 such that both cameras 134, 136 additionally view the top side 202 of the package 102. When the cameras 134, 136 are misaligned (FIG. 5), viewable portions 230 of the sides 200 are viewable in the images by the cameras 134, 136. However, unviewable portions 232 of the sides 200 are unviewable in the images as being out of view of the cameras 134, 136. The cameras 134, 136 are configured to be moved to the aligned positions (FIG. 6) to capture appropriate images of the package 102 for analysis.

Figure 7:
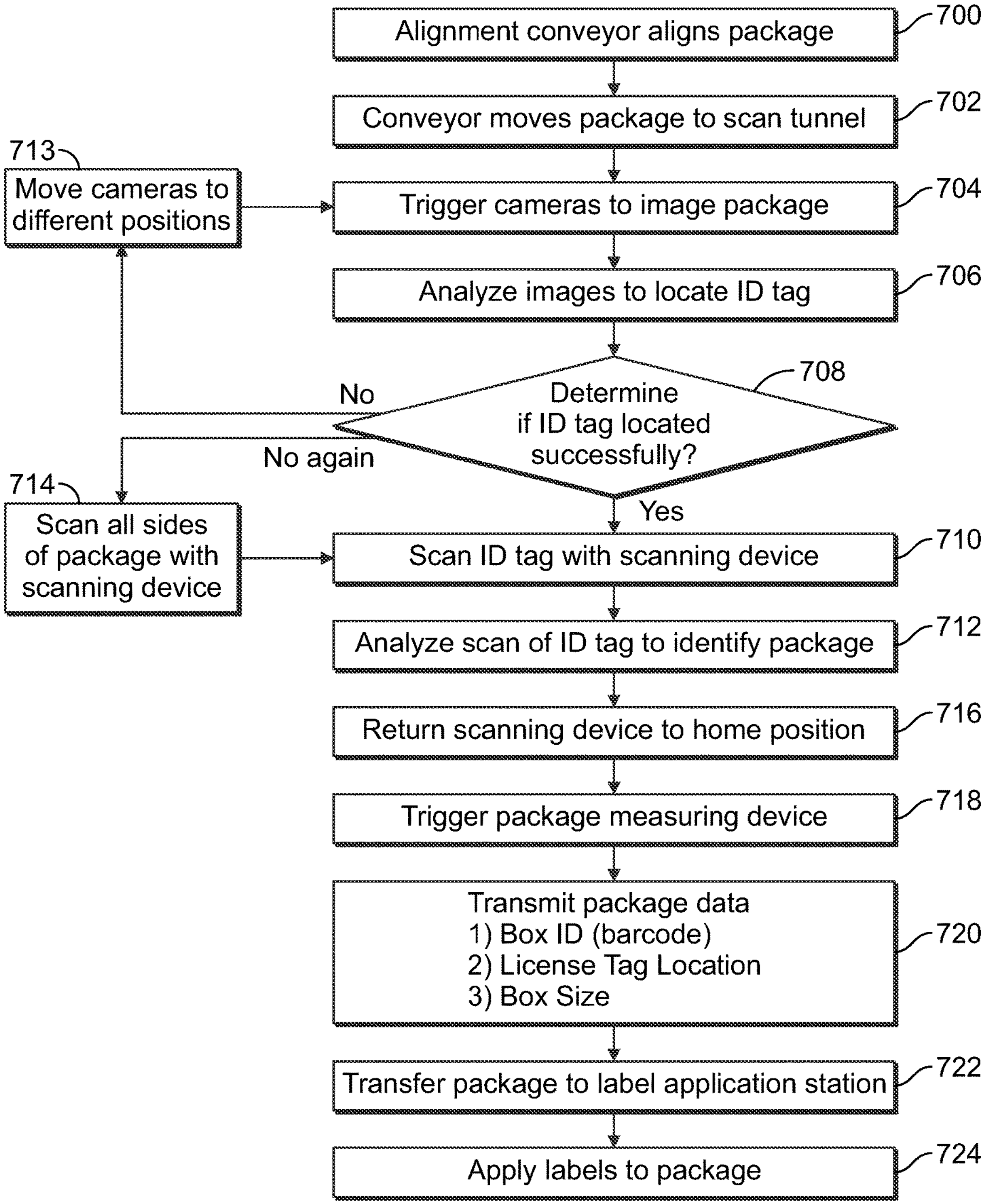
FIG. 7 is a flow chart showing a method of labeling packages in accordance with an exemplary embodiment.

FIG. 7 is a flow chart showing a method of labeling packages in accordance with an exemplary embodiment. The method is used to identify the package for proper labeling. The method is used to determine an orientation of the package for proper labeling. The method may include additional steps in alternative embodiments. In other various embodiments, one or more of the steps may be eliminated. Various steps may be performed in a different order in alternative embodiments.

The method at 700 includes using an alignment conveyor to align the package with a scan tunnel. For example, the alignment conveyor may straighten the package using a positioning device, such as a wall or other structure having a locating surface. At 702, the method includes moving the package into the scan tunnel. For example, the package may be moved by a conveyor or other type of automated device.

At 704, the method includes triggering a pair of cameras to image the package. For example, a controller for the system may cause the cameras to image the package when the package is located in the scan tunnel. At 706, the method includes analyzing the images to locate an identification tag on the package. At 708, the controller determines if the identification tag was located successfully. If the identification tag is successfully located, at 710, the controller moves a scanning device to the side of the package having the identification tag and scans the identification tag. At 712, the controller analyzes the scan of the identification tag to identify the package.

If, at 708, the identification tag was not located successfully, the controller moves 713 the cameras to a different position within the scan tunnel. For example, the cameras may move along a positioning rail within the scan tunnel. The method returns to steps 704, 706, 708 to reimage the package, analyze the image and again determine if the identification tag is located successfully. If the controller is again unable to successfully locate the identification tag, the method, at 714, includes scanning all sides of the package using the scanning device. For example, the top side, the front side, the right side, the rear side, and the left side are all scanned by the scanning device, which is movable in three-dimensional space around the package for scanning. After all sides of the package or scanned using the scanning device, the method returns to step 712 to analyze the scans to identify the package. Optionally, after scanning all of the viewable sides of the package, the identification tag is still not located, the controller may cause the scanning device to roll the package over to scan the bottom of the package for the identification tag.

After the identification tag is scanned and the scan analyzed to identify the package, at 716, the method includes returning the scanning device to a home position. At 718, the method includes triggering a package measuring device to measure one or more dimensions of the package. For example, the package measuring device is used to determine a height and/or a width and/or a length of the package.

At 720, the method includes transmitting package data to a label application station for label application on the package. In an exemplary embodiment, the package identification is transmitted to the label application station, the package orientation (for example, the side of the package having the identification tag) is transmitted to the label application station, and the package dimensions may be transmitted to the label application station. The package identification is transmitted so the label application station knows which labels to print. The package orientation is transmitted so the label application station knows which side of the package to apply the labels. The package dimensions are transmitted so the label application station knows where to apply the labels on the package.

At 722, the package is transferred to the label application station. For example, a conveyor or other automated moving device moves the package from the scan tunnel to the label application station. At 724, the method includes applying labels to the package. For example, the label application station may include a label printer and a label applicator. The label printer prints the labels, based on the package identification information. The label applicator retrieves the printed label and applies the printed label to an appropriate side of the package, based on the package orientation information and the package dimension information.

Figure 8:
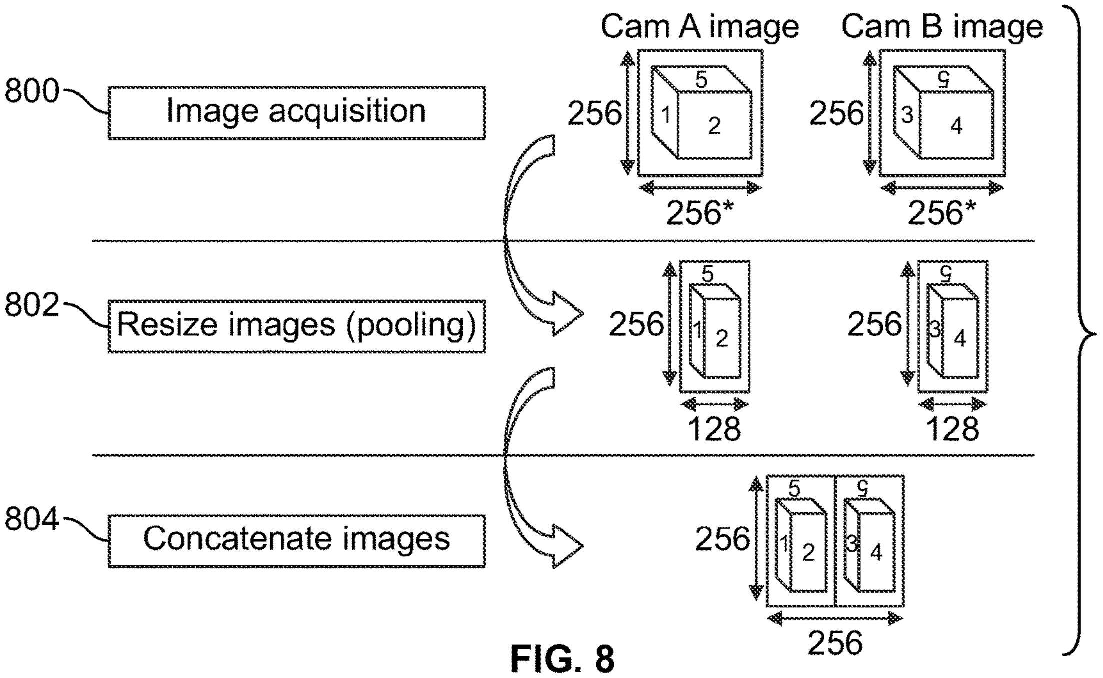
FIG. 8 is a flowchart showing a method of analyzing images to determine a package orientation in accordance with an exemplary embodiment.

FIG. 8 is a flowchart showing a method of analyzing images to determine a package orientation. For example, the method includes analyzing the images to determine which side of the package 102 that includes the identification tag 104.

At 800, the method includes acquiring a first image of the package from a first camera and acquiring a second image of the package from a second camera. The first image is taken from a first angle and the second image is taken from a second angle different from the first angle. In an exemplary embodiment, the first and second cameras image the package from opposite sides of the package. In an exemplary embodiment, the first and second cameras are configured to image opposite corners of the package such that all sides of the package, other than the bottom, are acquired in the two images. For example, the first camera images the top side 202, the front side 206 and the right side 210 of the package 102, while the second camera images the top side 202, the rear side 208 and the left side 212. Optionally, the images may be cropped such that the package occupies a majority of the images. In various embodiments, the images may be digital images having a standard size, such as 256 pixels by 256 pixels.

At 802, the method includes resizing the first and second images. For example, the first and second images may be resized by pooling the first and second images. The first and second images may be resized by halving the widths of the first and second images, such as to a size of 128 pixels by 256 pixels.

At 804, the method includes concatenating the first and second images into a combined image. The first and second images are arranged side-by-side in the combined image. In various embodiments, the combined image may be a digital image having a standard size, such as 256 pixels by 256 pixels. The combined image is analyzed to determine which side of the package has the identification tag. As such, a single image is analyzed by the controller, rather than analyzing multiple images, which may reduce computing time by the controller to identify the identification tag. The controller may include a convolutional neural network to analyze the combined image and determine the location of the identification tag.

Figure 9:
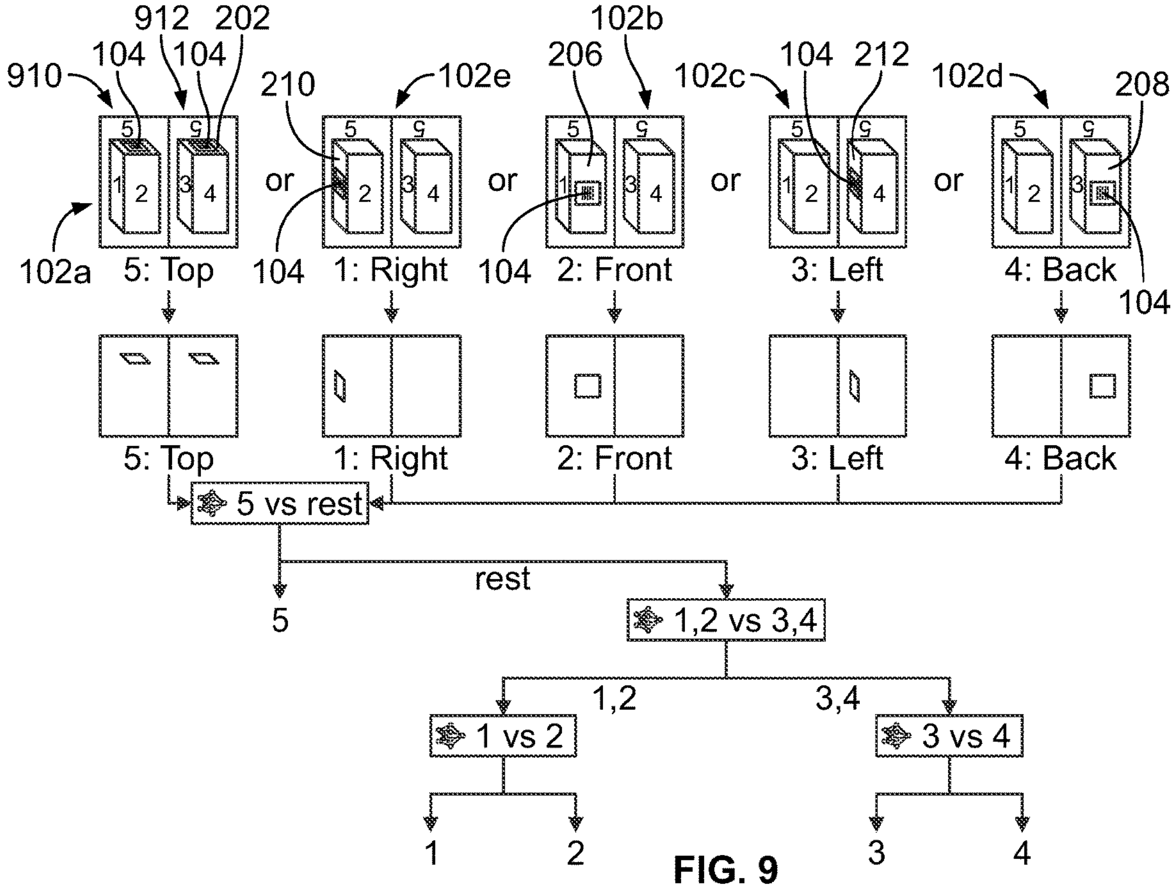
FIG. 9 illustrates examples of image analysis by the robotic labeling system to determine a package orientation in accordance with an exemplary embodiment.

FIG. 9 illustrates examples of image analysis by the robotic labeling system to determine a package orientation. The images are analyzed to determine which side of the package 102 includes the identification tag 104. In an exemplary embodiment, the images are converted to grayscale and filtered to highlight the identification tag within the image. The white license tag is easily recognizable in the grayscale image for a computer vision algorithm.

FIG. 9 illustrates the package 102*a* having a top-side orientation at 900 with the identification tag 104 at the top side 202; illustrates the package 102*d* having a right-side orientation at 902 with the identification tag 104 at the right side 210; illustrates the package 102*b* having a front-side orientation at 904 with the identification tag 104 at the front side 206; illustrates the package 102*e* having a left-side orientation at 906 with the identification tag 104 at the left side 212; and illustrates the package 102*c* having a rear-side orientation at 908 with the identification tag 104 at the rear side 208.

The controller identifies the location of the identification tag 104 in the grayscale image to determine the package orientation. For example, the image is considered to have a first half 910 and a second half 912 corresponding to the image taken by the first camera in the image taken by the second camera, respectively. The controller may use a decision tree and binary classifications to determine the package orientation. For example, if both halves of the image include the identification tag, such as in the upper portions of the image, the controller determines that the package has a topside orientation. If the identification tag is not found in both sides, the controller determines that the package has one of the right side orientation, the front side orientation, the left side orientation, or the rear side orientation. The controller then determines if the identification tag is located in the first half 910 or in the second half 912. If the identification tag is in the first half 910, the controller compares the shape and/or the location of the identification tag in the first half 910 to determine if the package has a right side orientation or a front side orientation. If the identification tag is in the left half 912, the controller compares the shape and/or the location of the identification tag in the second half 912 to determine if the package has a left side orientation or a rear side orientation. The package orientation information may be transmitted to a label application station for labeling the package.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A robotic labeling system for labeling a package having an identification tag, the robotic labeling system comprising:

a package identification station having a frame, a first camera mounted to the frame, a second camera mounted to the frame remote from the first camera, and a scanning device mounted to the frame;

the frame forming a scan tunnel configured to receive the package;

the first camera imaging a first area of the scan tunnel to image the package from a first angle;

the second camera imaging a second area of the scan tunnel different from the first area to image the package from a second angle;

the scanning device having a tag reader movable in three-dimensional space within the scan tunnel to scan the identification tag of the package based on the images from the first and second cameras.

2. The robotic labeling system of claim 1, wherein the scanning device determines a location of the identification tag based on the images from the first and second cameras to control positioning of the tag reader for scanning the identification tag.

3. The robotic labeling system of claim 1, wherein the first camera images a first corner of the package and the second camera images a second corner of the package opposite the first corner.

4. The robotic labeling system of claim 1, wherein the first camera images a top side, a front side, and a right side of the package and the second camera images the top side, a rear side, and a left side of the package.

5. The robotic labeling system of claim 1, wherein the first camera is movable relative to the frame to change the first angle and the second camera is movable relative to the frame to change the second angle.

6. The robotic labeling system of claim 1, wherein the frame includes at least one positioning rail at least partially surrounding the scan tunnel, the first and second cameras mounted to the at least one positioning rail, the first and second cameras being movable along the at least one positioning rail to very positions of the first and second cameras relative to the scan tunnel.

7. The robotic labeling system of claim 1, further comprising a controller operably coupled to the scanning device, the controller receiving the images from the first and second cameras, the controller determining an orientation of the package in the scan tunnel by analyzing the images of the first and second cameras to identify a side of the package including the identification tab using digital image analysis.

8. The robotic labeling system of claim 7, wherein the controller determines a label application side of the package different from the side having the identification tag based on the images of the first and second camera.

9. The robotic labeling system of claim 7, further comprising a label application station downstream of the package identification station, the controller being operably coupled to the label application station, the label application station including a label printer and a label applicator, the label printer configured to print a package label, the label applicator operating with the label printer to apply the package label to the package, wherein the printing of the package label by the label printer is based on the scan of the identification tag by the tag reader and wherein the application of the package label by the label applicator is based on the scan of the identification tag by the tag reader.

10. The robotic labeling system of claim 7, wherein the controller resizes the first image from the first camera and the second image from the second camera and concatenates the first and second images into a combined image, the controller performing digital image analysis of the combined image to determine the side of the package including the identification tag.

11. The robotic labeling system of claim 1, wherein the scanning device includes a reader manipulator including an articulating arm movable in three-dimensional space, the tag reader being coupled to the articulating arm.

12. The robotic labeling system of claim 11, wherein the articulating arm is configured to engage the package to flip the package over to expose a bottom of the package.

13. The robotic labeling system of claim 1, further comprising a package measuring device configured to measure at least one of a height, a width, or a length of the package.

14. The robotic labeling system of claim 13, wherein the package measuring device is coupled to the frame to view the package in the scan tunnel.

15. A robotic labeling system for labeling a package having an identification tag, the robotic labeling system comprising:

a package locating system having at least one conveyor for moving the package to a package identification station and a label application station of the robotic labeling system;

the package identification station including a frame forming a scan tunnel configured to receive the package from the at least one conveyor, the package identification station including a first camera mounted to the frame and a second camera mounted to the frame remote from the first camera, the first camera imaging a first area of the scan tunnel to image the package from a first angle, the second camera imaging a second area of the scan tunnel different from the first area to image the package from a second angle, the package identification station including and a scanning device mounted to the frame having a tag reader movable in three-dimensional space within the scan tunnel to scan the identification tag of the package based on the images from the first and second cameras; and the label application station including a label printer and a label applicator, the label printer configured to print a package label, the label applicator operating with the label printer to apply the package label to the package, wherein the printing of the package label by the label printer is based on the scan of the identification tag by the tag reader and wherein the application of the package label by the label applicator is based on the scan of the identification tag by the tag reader.

16. A method of labeling a package comprising:

locating the package in a scan tunnel at a package identification station;

positioning a first camera in the scan tunnel to image a first area of the scan tunnel;

positioning a second camera in the scan tunnel to image a second area of the scan tunnel different than the first area;

imaging the package in the scan tunnel with the first camera from a first angle;

imaging the package in the scan tunnel with the second camera from a second angle different than the first angle;

processing a first image of the package from the first camera and a second image of the package from the second camera to determine a side of the package having an identification tag; and scanning the identification tag of the package identified by processing the first and second images, the scanning is performed by a tag reader of a scanning device movable in three-dimensional space within the scan tunnel to all sides of the package.

17. The method of claim 16, further comprising moving the first camera relative to the package to image a first corner of the package and moving the second camera relative to the package to image a second corner of the package opposite the first corner.

18. The method of claim 16, further comprising:

printing a package label at a label printer, the package label being generated based on the identification tag scanned by the tag reader; and applying the package label using a label applicator, the label applicator applying the package label to a different side of the package than the side of the packaging having the identification tag as determined by processing the first and second images.

19. The method of claim 16, further comprising determining dimensions of the package using a package measuring device.

20. The method of claim 16, wherein said scanning the identification tag includes moving the tag reader in three dimensional space into proximity with the side of the package having the identification tag as determined by processing the first and second images.

* * * * *